United States Patent [19]

Hermann

[11] Patent Number: 5,270,689
[45] Date of Patent: Dec. 14, 1993

[54] MULTI-FUNCTION OPERATING DEVICE

[75] Inventor: Künzner Hermann, Munich, Fed. Rep. of Germany

[73] Assignee: Baverische Motoren Werke AG, Fed. Rep. of Germany

[21] Appl. No.: 426,186

[22] Filed: Oct. 25, 1989

[30] Foreign Application Priority Data

Oct. 27, 1988 [DE] Fed. Rep. of Germany ....... 3836555

[51] Int. Cl.⁵ .............................................. G09G 3/02
[52] U.S. Cl. .................................... 345/145; 345/157
[58] Field of Search ............... 340/709, 706, 711, 712, 340/602, 710, 723; 400/63; 364/431.03, 551.01, 552, 426.02; 219/494; 84/615; 379/63; 360/137; 200/552

[56] References Cited

U.S. PATENT DOCUMENTS

| 4,131,033 | 12/1978 | Wright et al. | 200/316 |
| 4,218,775 | 8/1980 | Cox et al. | 360/137 |
| 4,324,966 | 4/1982 | Tanabe | 340/602 |
| 4,390,861 | 6/1983 | Cohen et al. | 340/706 |
| 4,419,654 | 12/1983 | Funk | 364/426.02 |
| 4,561,049 | 12/1985 | Deleganes et al. | 340/723 |
| 4,685,064 | 8/1987 | Kinoshita et al. | 340/709 |
| 4,712,101 | 12/1987 | Culver | 340/710 |
| 4,763,117 | 8/1988 | Blattner et al. | 340/712 |
| 4,818,131 | 4/1989 | Sakai | 400/63 |
| 4,836,699 | 6/1989 | Babsch et al. | 340/711 |

Primary Examiner—Alvin E. Oberley
Assistant Examiner—Steve Saras
Attorney, Agent, or Firm—Evenson, McKeown, Edwards & Lenahan

[57] ABSTRACT

In the case of a multi-function operating device for motor vehicles, a single bidirectional rotary switch having stop positions and axial movability is used to designating function groups and to select them by means of an enter function arrangement and subsequently, within the respective function group, select the pertaining function in the same manner. The sole operating element in the form of the rotary switch can be operated without any problems and permits the desired selection or operating function at any time and without drawing attention away from the traffic situation.

8 Claims, 3 Drawing Sheets

MULTI-FUNCTION OPERATING DEVICE

BACKGROUND AND SUMMARY OF THE INVENTION

The present invention relates to a multi-function operating device, and more particularly, to an operator control arrangement for selecting one of a plurality of available function groups and for operating the functions listed by a menu of a selected function group using a simple rotary switch which does not require excessive visual attention on the part of an operator.

In a device of this general type disclosed by DE 31 04 668 Al, several rotary switches, the so-called operator control, are provided for the selection of function groups and the operation of individual functions as well as for the input of data records. However, this text does not contain any other information concerning the construction and the method of operation of the rotary switches.

Pushbuttons and sensor keys, which may also be used to carry out the above-mentioned selections, are concretely shown in this text and have also been disclosed in DE 35 14 438 Cl, an embodiment being described in detail in this respect.

All known operator control arrangements for selecting function groups and individual functions listed by a menu of a selected function group have in common that they can be used only to a very limited extent in motor vehicles. The reason is that the known selection arrangements, as a result of the menu structure of the function groups, require excessive operator attention due to the repeated and relatively complex operation of control elements.

As a rule, these operator control elements differ and require extreme attention. Therefore, it is not possible to easily select function groups or individual functions of these function groups during a driving operation which requires the vehicle user's complete concentration. During such a selection process, the driver is forced to turn his attention away from the traffic situation. As a result, the respective desired function, as a rule, is not easily available and cannot be set immediately, as desired. It can therefore not be said that the known operating devices are convenient to the user of a vehicle.

The limited usability of the above-noted operator control arrangements also results in considerable acceptance problems by prospective users not only with respect to the operator controls, but also with respect to all pieces of equipment controlled by them. These pieces of equipment are, for example, an air-conditioning system, a navigating system, a car radio, a car telephone, an anti-theft system, a vehicle computer or a diagnostic unit, to mention only a few. This is most regrettable, as more equipment of this type becomes available in modern motor vehicles.

The present invention is based on an object of providing an operator control arrangement for a multi-function operating device of the initially mentioned type which has a simple construction and permits a simple selection of a desired function or a desired menu of a function group that is possible at any time, particularly during the operation of a motor vehicle.

Preferred embodiments of the invention achieve this and other objects by utilizing a single rotary switch as an incremental generator for designating and selecting different function groups and individual functions listed by a menu of a selected function group. By means of this unique arrangement, it is possible to designate a desired function group using the rotary switch, to switch over to this designated function group by operating an enter function arrangement using the rotary switch, and then, by using the same rotary switch, designate and select a desired function after operating the enter function arrangement, including the capability of entering a data record.

The rotary switch, which requires only little space, may be arranged in convenient reach of the vehicle user. It can be found by feel and operated blindly and requires no or little visual attention from the vehicle user. By providing the rotary switch with bidirectional characteristic, it is possible to designate and select a desired function or function group at any time and very rapidly. Existing stop positions of the rotary switch permit an accurate selection of a given setting and provide protection from an unintentional setting of the rotary switch which may be caused, for example, by outside influences.

It may also be useful to provide the vehicle user with an aid for the selection of the correct function group or individual function. This may take place mechanically by means of an operating resistance connected with the setting of the stop positions, or acoustically by a corresponding voice output and/or other acoustic information such as beeping or the like.

It is particularly advantageous to provide visual support to the operator of the multi-function device. For this purpose, it is possible to provide visual emphasis to a display of a designated or selected function group or individual function, for example, which make the respective selection possibilities particularly impressive and, in addition, make the function group or function assigned to the stop position clearly recognizable. In this case, a suitable graphic design can heighten the effect of the visual display.

This includes, for example, the arrangement, in a circle on a display, of the identifications, symbols or the like corresponding to the stop positions for each of the different function groups or functions. There is also the imaging of the displays by way of the windshield in the driver's field of vision. As a result, the visual display can also be recognized during the driving operation and a controlling of the selected or set function group or function becomes possible without the need for the driver to divert attention from the road.

An improvement of the visual aid is achieved in that the selected and/or set (by means of the enter function arrangement) function group or function is clearly emphasized visually on the display. This may take place, for example, by the light or dark display of the pertaining legend or of the pertaining symbol or by any other visual marking identifying the selected item. For a better identification, the visual emphasizing may differ before and after the triggering of the enter function arrangement. Thus, it becomes easily recognizable whether the triggering of the enter function arrangement is still required for the respective function or function group.

The rotary switch according to the invention is particularly advantageous when the entering of an alphanumerical data record is involved. This entering of a data record may take place in connection with the input of a telephone number, of a searched street (for a vehicle guiding system) or even in connection with a traffic radio module, in which the traffic radio information can be called which is present under a selectable keyword. In the case of existing visual support, the selection of the possible numbers or letter can then be displayed.

It may be particularly advantageous in this connection to provide an additional memory which contains all the possible data records. For a vehicle guiding system, for example, the stored street names may be filed in the memory. For the input of the desired street name, the visual aid may now be designed such that, during the inputting of the individual letters of the street name, in front of each next letter, only those letters are visually emphasized which are part of a street name stored and filed in the memory. This not only accelerates the inputting of the street name, but it is also achieved that only those street names can be entered which are present in the memory. The vehicle user can therefore be sure that the street name entered by him is actually present in the memory.

Despite the clearly simplified operation offered by the operator control of the present invention, it may occur that a function or function group is selected erroneously. In this case, it may become necessary to have a correcting capability. In the initially mentioned DE 31 04 668 Al, this capability was addressed in principle. However, this text contains no additional information in this respect.

In the case of one particular embodiment of the invention, a correcting capability can be implemented particularly advantageously by means of the enter function arrangement. For this purpose, one of the stop positions of the rotary switch is provided with the pertaining correcting function selection. When this stop position is selected and the enter function arrangement is operated, the last input is cancelled. As a result, it becomes possible to select, instead of the selected function or function group, a replacement function and enter it by way of the enter function arrangement. As an alternative, the correcting function may also be triggered by means of the rotary switch itself. If it is, for example, provided for the enter function to be carried out by an axial movement of the rotary switch in one direction, for example, in the direction toward the switch base, the correcting possibility may also be triggered by an axial movement of the rotary switch in the opposite direction or vis-a-versa.

Other objects, advantages and novel features of the present invention will become apparent from the following detailed description of the invention when considered in conjunction with the accompanying drawings.

DETAILED DESCRIPTION OF THE DRAWINGS

Figure 1:
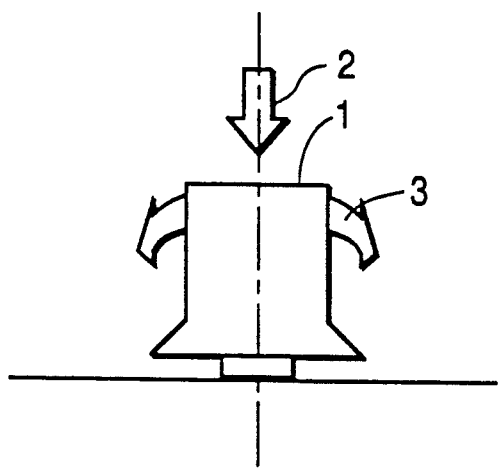
FIG. 1 is a view of the basic construction of the operator control of a multi-function operating device according to one embodiment of the invention in the form of an incremental rotary switch.

The operator control of a multi-function operating device according to the invention includes a rotary switch 1, as the central element, which, in FIG. 1, is shown in sectional view and from the side. The rotary switch 1 can be rotated around an axis of rotation A, as indicated by arrow 3 and, in addition, can be moved in an axial direction, indicated by an arrow 2, against a spring or alternatively up or down along the axis of rotation A.

For defined given angles of rotation, the rotary switch 1 also has stop positions in which it is held and out of which it can be rotated farther by one stop position against a respective stop resistance. This rotatability may take place bi-directionally as indicated by symbol 3.

By means of the rotary switch 1, it is possible to select functions for a multi-function device of a motor vehicle, the functions being arranged in different function groups (menus). As mentioned above, these multi-function devices may be a navigating system, a heater/air-conditioning control, a car telephone, a car radio, a television, a vehicle computer or other device for various operating, display or playback functions.

Figure 2:
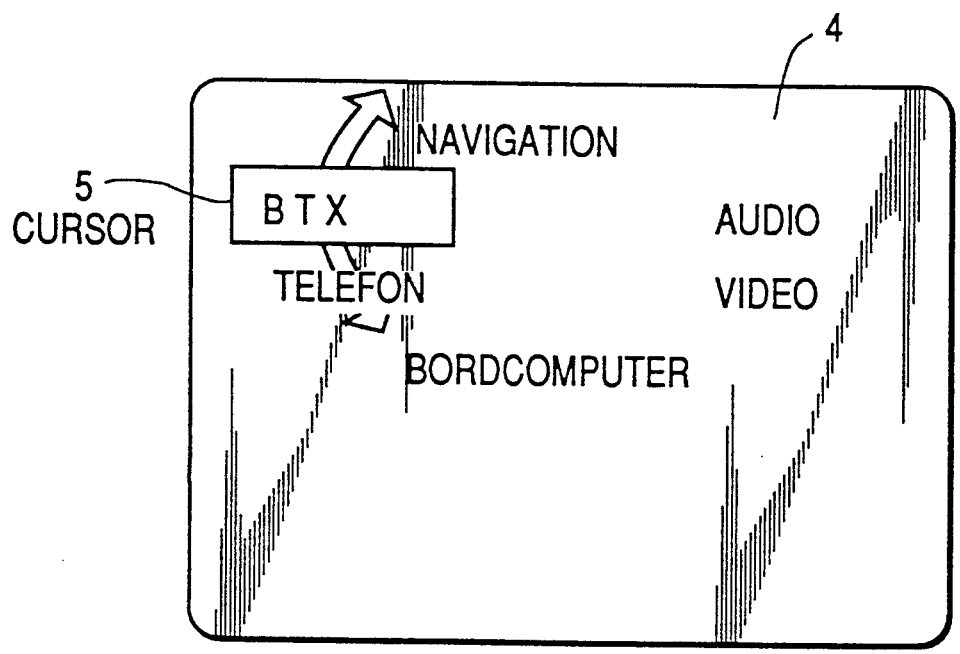
FIG. 2 is a schematic view of a video screen display arrangement according to one embodiment of the present invention.

For the setting of the desired function, it is first necessary to select the pertaining menu of the function group. For this purpose, the name or any other symbol of the existing function groups is displayed in a set selection mode or designation mode on a pertaining video screen 4, as shown in FIG. 2. In this case, the function group which belongs to the set stop position of the rotary switch 1 is visually emphasized. This may take place by a light or dark display, by framing or in another visual manner as by underlining or blinking or the like. In FIG. 2, this emphasizing is symbolized by a frame 5. By moving to the next stop position of the rotary switch 1 in either direction, a switching takes place from the previously designated function group, i.e., video screen text (BTX) shown in FIG. 2 to the next adjacent function group in the direction of rotation, i.e. a vehicle guiding system ("Navigation") or to the vehicle computer.

For the selection of a visually emphasized function group, it is now necessary to briefly press the rotary switch 1 in the axial direction delineated by arrow 2 in FIG. 1. This selects the designated function group. The individual functions assigned to the respective function group will now appear via a menu on the video screen display 4.

Figure 3:
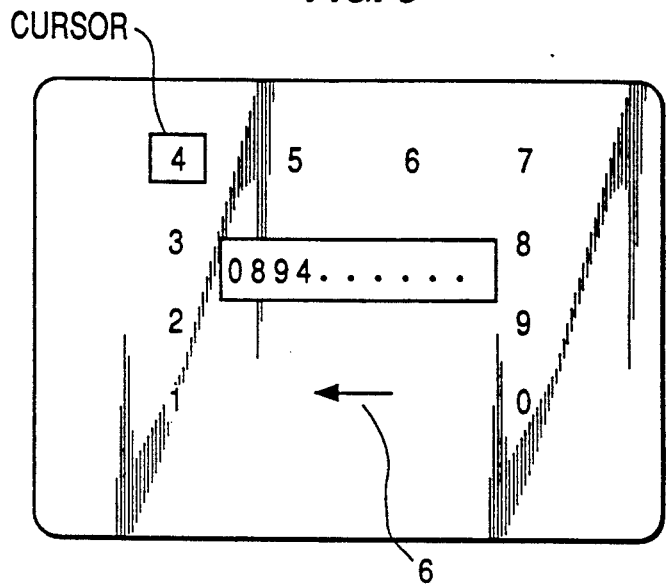
FIG. 3 is another video screen display arrangement for entering a telephone number.
Figure 5:
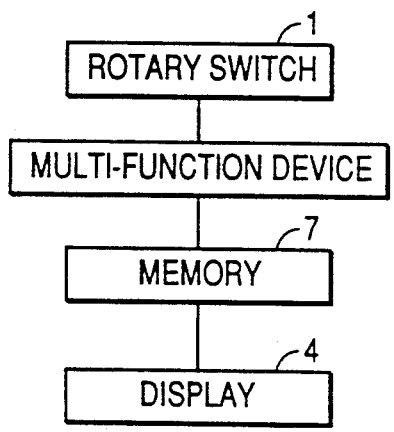
FIG. 5 shows the arrangement of elements for the computer assisted word input of a sequence of a computer assisted word input in accordance with a further embodiment of the present invention.

In a simplified manner, this is shown in FIG. 3. In this case, the selected function group illustrated is a car telephone system. In an approximately circular arrangement, the ten numbers of a telephone dialing system will then appear on the video screen 4 as well as an additional field 6, the function of which will be explained below.

Of the ten numbers, that number is in each case visually emphasized which is assigned to the set stop position occupied by the position of the rotary switch 1. In the present case illustrated by FIG. 3, this is the number 4. For the dialing of the desired telephone number, it is now necessary to successively designate the numbers 0 to 9 and select or set them by triggering an enter function. The enter function is triggered by the above-described axial movement of the rotary switch 1. FIG. 3 shows the setting of a telephone number which starts with the number sequence 0894. In this case, 4, as described, is set in that first the stop position of the rotary switch 1 assigned to the number 4 is selected and the enter function is actuated. Subsequently, the rotary switch is brought into the stop position which is assigned to the next desired number.

If it is found that the set number is not desired, it is possible to cancel the last set number by means of the additional field 6. For this purpose, the rotary switch must be brought into the lock position which corresponds to the additional field 6 and then the enter function must be triggered by axial movement of the rotary switch. Thus, the last set number, in this case, the number 4, is cancelled. Subsequently, the next number which follows the number 9 may be selected in the desired manner and may be set by actuating the enter function.

Several possibilities are provided for the switching from the car telephone function, which is explained by means of FIG. 3, to another menu of a function group.

Thus, it is possible, for example, to completely cancel the set number sequence by actuating the enter function several times in a stop position of the rotary switch 1 in which the additional field 6 is designated. After the last cancelled number, in this case, the number "0", by means of another triggering of the enter function, the overview menu of FIG. 2 is shown again, and another function group is selected in the described manner.

However, it is also possible to select the return into the overview menu of FIG. 2 directly, i.e., by means of another additional field of FIG. 3 analogous to the additional field 6 (not shown) or by holding the enter function for a longer set period of time.

Figure 4:
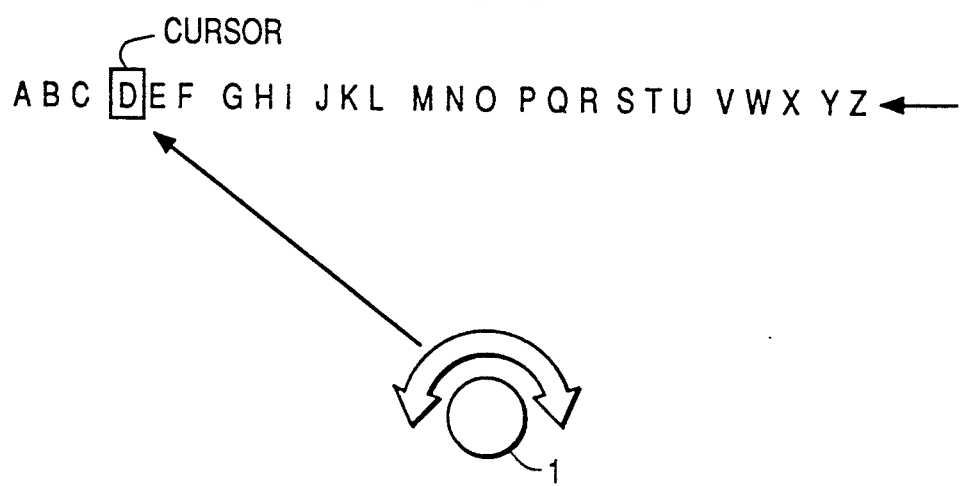
FIG. 4 is a video screen display in connection with the input of a word of a data record.

By means of the rotary switch 1, it is also possible to enter a word, i.e., a sequence of letters or a word combination. This is important, for example, within the framework of a navigating system which involves the designation of a starting point and/or end point of a driving route. In this case, by selecting the function group entitled navigation and actuating the enter function, a display may be set in the video screen 4 which comprises the alphabet. In this case, the stop positions of the rotary switch 1 correspond to the individual letters. As shown in FIG. 4, the stop position, which is shown here as an example, corresponds to the letter "d" which, as explained, is visually emphasized. It may be set by actuating the enter function. As in the preceding figures, a differentiation can be made between the designated and the set and selected letter "d" by means of a different visual emphasis. Thus, the operator can see whether he has set the letter "d" or whether is setting request was, for example, not accepted.

By means of the rotary switch 1, it is therefore possible to also enter a sequence of letters.

Figure 6:
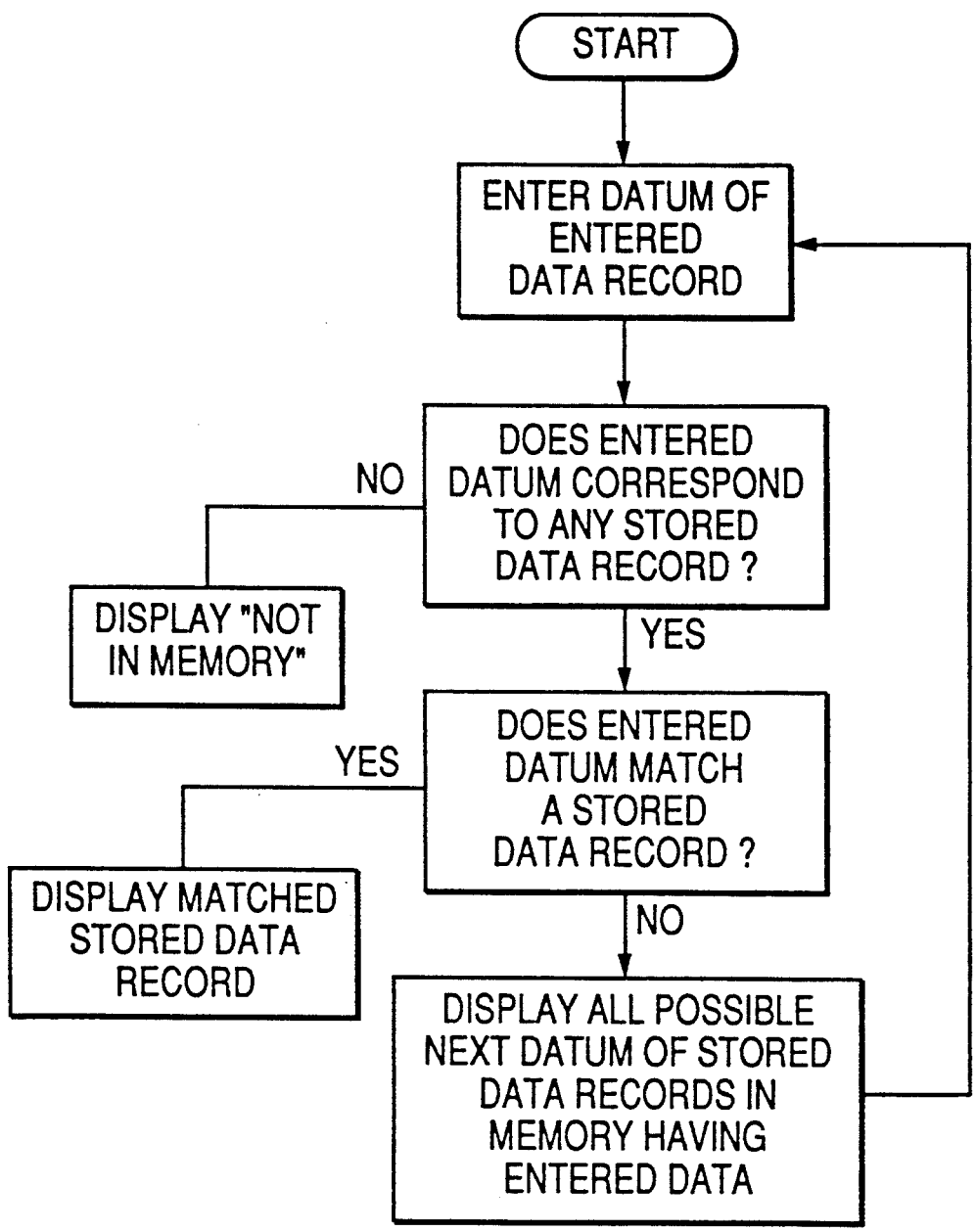
FIG. 6 shows a flow chart for software or firmware for the sequence of the computer assisted word input in accordance with the further embodiment.

Particularly in connection with the entering of letter sequences, a further embodiment of the invention is particularly useful. In this embodiment, the possible sequences of letters are stored and filed in an assigned memory 7 as shown in FIG. 6. Those letter sequences are possible in this case which are documented in the system in any manner. In the case of a navigation system, this means that the memory contains the street names or city names of the existing city maps or general maps.

For entering a desired street name, in this embodiment, for example, "Daglfinger Strasse", the letter "d" is first designated and set by means of the enter function as set forth in the following example:

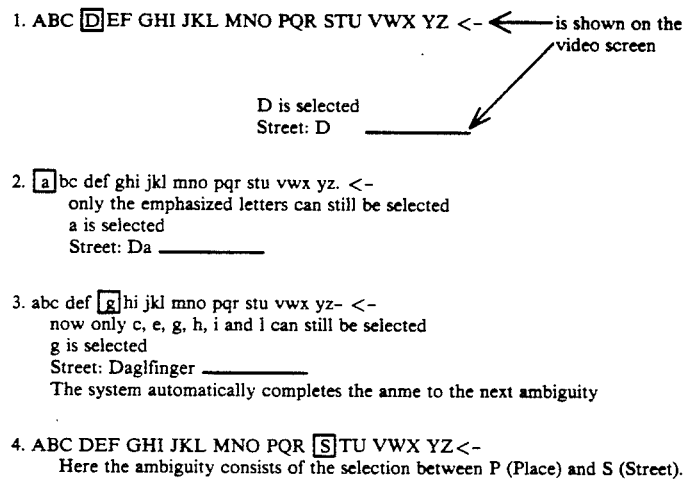

1. ABC [D]EF GHI JKL MNO PQR STU VWX YZ <- ←——is shown on the video screen

D is selected
   Street: D

2. [a]bc def ghi jkl mno pqr stu vwx yz. <-
   only the emphasized letters can still be selected
   a is selected
   Street: Da ─────

3. abc def [g]hi jkl mno pqr stu vwx yz- <-
   now only c, e, g, h, i and l can still be selected
   g is selected
   Street: Daglfinger ─────
   The system automatically completes the anme to the next ambiguity 4. ABC DEF GHI JKL MNO PQR [S]TU VWX YZ<-
   Here the ambiguity consists of the selection between P (Place) and S (Street).

On the video screen, all those letters are now visually emphasized which are present in second place of all the street names stored in the memory starting with letter "d". In this case, they are, for example, the letters "a", "e", "i", "o", "r" and "u". The designation of the letter "a" is then made and entered/set by means of the enter function.

Immediately afterwards, those letters which correspond to the next letter of street names stored in the memory which begin with "da" are visually emphasized. These are the letters "c", "e", "g", "h", "i" and "l".

If now the letter "g" is designated and entered/set, the system automatically supplements the name to the next ambiguity. Thus the word "Daglfinger" will already appear. The letters "P" (for space) and "S" (for street) are visually emphasized. If "S" is selected, the system automatically completes to name the "Daglfinger Strasse". The flow chart of FIG. 7 provides an outline for the operation of software or firmware for accomplishing the function of this embodiment.

If an input is incorrect, the input may be cancelled successively by means of a correcting function, as previously described with respect FIG. 3, the system in each case going back to the preceding ambiguity.

Correspondingly, numbers, for example, for speed limits, distances and the like, may also be entered by means of the rotary switch 1. According to the application and usefulness, counting may take place upward or downward in fixed increments of, for example, 10 units, or the individual positions of numbers may be changed incrementally by, for example, one unit. The selection and setting of the desired number takes place as described above.

In this manner, it is possible to select and set the individual functions by means of only one rotary switch and carry out the required inputting also within the respective function. The whole setting, selecting and changing process is possible without any visual turning to the rotary switch. Its stop positions provide a precise tactile control of the whole operation. If necessary, visual aids may be used as explained.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An operator control of a multi-function operating device in a motor vehicle for selecting between a plurality of function groups and for selecting individual functions of a selected function group from a menu of the selected function group comprising:

a bidirectional rotary switch for designating one of the plurality of function groups and for designating one of the individual functions of the selected function group from the menu of the selected function group by rotation of said bidirectional rotary switch, said individual functions within a selected function group differing for each of said plurality of function groups;

stop means for providing the rotary switch with a number of stop positions, one of the plurality of function groups and one of the individual functions of each of the function groups being assigned to each of the stop positions; and enter function means for entering said one designated function group and said one designated individual function of the selected function group, the enter function means being subsequently independently triggered by an axial movement of the rotary switch distinct from said rotation of said bidirectional switch to designate one of the plurality of function groups and one of the individual functions.

2. An operating device according to claim 1, wherein the number of stop positions of the rotary switch is coordinated with at least one of a number of the plurality of function groups and a number of the individual functions of each function group.

3. An operating device according to claim 1, wherein individual displays on a video screen are provided for at least one of each of the plurality of function groups and each of the individual functions of each function group, and wherein the individual display for each of the function groups and each of the individual functions designated by the rotary switch is visually emphasized.

4. An operating device according to claim 3, wherein the individual display for each of the function groups and each of the individual functions designated by the rotary switch is visually emphasized after the triggering of the enter function means.

5. An operating device according to claim 3, wherein the individual display for each of the function groups and each of the individual functions designated by the rotary switch differs before and after the triggering of the enter function means.

6. An operating device according to claim 1, wherein one of the individual functions is an input function for entering a data record, the input function consisting of entering means for successively entering alphanumerical data of the data record via the rotary switch.

7. An operating device according to claim 6, wherein a memory is provided containing a plurality of possible data records, the operating device further comprising selection means for selecting all possible data records corresponding to entered alphanumerical data of an entered data record and for displaying all possible data records corresponding to entered alphanumerical data in a visually differentiated manner.

8. An operating device according to claim 1, further comprising correction means for correcting at least one of an incorrectly entered function group and an incorrectly entered individual function, wherein the correcting means is carried out by the enter function means during a stop position of the rotary switch which is assigned to a correcting function.

* * * * *